(12) United States Patent
Hingle

(10) Patent No.: US 6,394,554 B1
(45) Date of Patent: May 28, 2002

(54) "7"-SHAPED SEAT BELT PILLOW

(76) Inventor: Megan E. Hingle, 836 Lamar Ave., Gretna, LA (US) 70056

( * ) Notice: Subject to any disclaimer, the term of this patent is extended or adjusted under 35 U.S.C. 154(b) by 0 days.

(21) Appl. No.: 09/632,598

(22) Filed: Aug. 4, 2000

(51) Int. Cl.[7] .................................................. A47C 31/00
(52) U.S. Cl. .................... 297/482; 297/397; 297/DIG. 6
(58) Field of Search ................................. 297/482, 464, 297/397, 391, DIG. 3, DIG. 6

(56) References Cited

U.S. PATENT DOCUMENTS

| | | | | |
|---|---|---|---|---|
| 3,327,330 A | * | 6/1967 | McCullough | 297/391 |
| 3,957,282 A | * | 5/1976 | Finnigan | 280/744 |
| 4,838,611 A | * | 6/1989 | Talaugon | 297/391 |
| 5,114,185 A | * | 5/1992 | Reedom | 297/482 |
| 5,205,611 A | * | 4/1993 | Stephens | 297/391 |
| 5,584,536 A | * | 12/1996 | White | 297/482 |
| 5,586,351 A | * | 12/1996 | Ive | 297/397 |
| 5,785,388 A | * | 7/1998 | Curtis | 297/482 |
| 6,017,094 A | * | 1/2000 | Syiek | 297/482 |
| 6,052,848 A | * | 4/2000 | Kelly | 5/640 |
| 6,135,560 A | * | 10/2000 | Fagg | 297/391 |
| 6,230,348 B1 | * | 5/2001 | Patrikakis | 5/636 |
| 6,230,349 B1 | * | 5/2001 | Silver | 297/393 |
| 6,254,189 B1 | * | 7/2001 | Closson | 297/397 |

* cited by examiner

Primary Examiner—Beth A. Stephan
(74) Attorney, Agent, or Firm—Raymond G. Areaux, Esq.; Lisa Velez

(57) ABSTRACT

The "7"-shaped seat belt pillow includes a neck-supporting pillow member which is adapted to be placed behind the head or neck while sitting in a vehicle's seat. The neck-supporting pillow member has integrally formed therewith a secondary body pillow member which is angled to approximate the angle of a buckled shoulder restraining strap. The secondary body pillow is adapted to be strapped to the seat belt and can be snuggled and hugged.

13 Claims, 2 Drawing Sheets

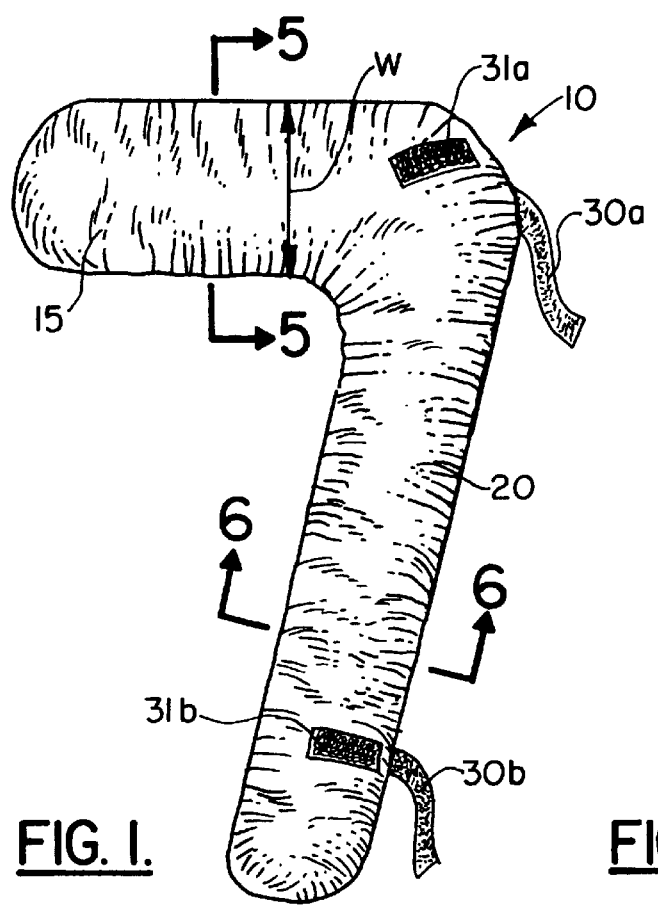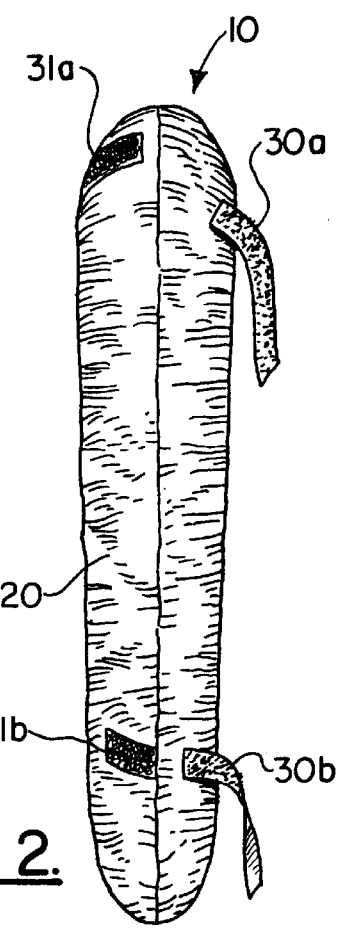
FIG. 1.
FIG. 2.
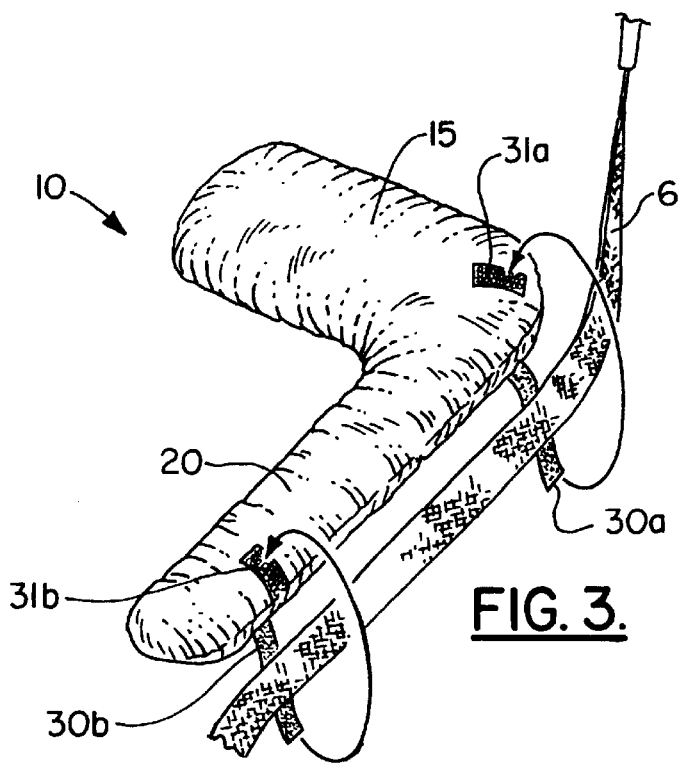
FIG. 3.

"7"-SHAPED SEAT BELT PILLOW

TECHNICAL FIELD

The present invention relates to pillows and, more particularly, to a "7"-shaped seat belt pillow to promote buckling of the shoulder restraint strap of a vehicle's seat belt while snoozing comfortably in a moving vehicle or other seat.

BACKGROUND OF THE INVENTION

U.S. Pat. No. 6,017,094, issued to Syiek, entitled "TRAVEL PILLOW" discloses a pillow having a removable cover and a seat belt coupling strap.

U.S. Pat. No. 5,785,388, issued to Curtis, entitled "SEAT BELT PILLOW" discloses a seat belt pillow adapted to have a "V", "U," "H," and "C" shapes. The seat belt pillow further includes hook and loop fastening means.

U.S. Pat. No. 5,584,536, issued to White, entitled "CUSHIONED SEAT BELT ATTACHMENT" discloses a cushioning device for the shoulder restraint portion of the seat belt. The cushioning device is coupled to the shoulder restrain portion in a manner which reduces pressures that are applied to the chest by the shoulder restraint portion.

U.S. Pat. No. 5,114,185, issued to Reedom, entitled, "PROTECTIVE CUSHION FOR AUTOMOTIVE VEHICLES" discloses a cushion which has the shape of people, animals or other objects and is adapted to be coupled to a seat belt. In another embodiment, the cushion can be coupled to the dashboard of a vehicle.

U.S. Pat. No. 4,838,611, issued to Talaugon, entitled "CAR SEAT PILLOW" discloses a car seat pillow which includes a pair of side cushions and a neck cushion extending between the pair. The car seat pillow is adapted to be attached to the shoulder straps of a harness assembly used to restrain a child in a child's car seat.

U.S. Pat. No. 3,957,282, issued to Finnigan, entitled "ATTACHMENT FOR A VEHICLE SHOULDER HARNESS" discloses an attachment which is designed to cover the shoulder strap of a seat belt so that the shoulder strap is prevented from contacting either the clothes or the skin of the user.

U.S. Pat. No. 3,327,330, issued to McCullough, entitled "COMFORT PILLOW" discloses a pillow designed to protect styled hair while supporting the neck. The pillow is described to have a L-shaped central body and wing portions which are hingedly coupled to the L-shaped central body via a seam.

As will be seen more fully below, the present invention is substantially different in structure, methodology and approach from that of prior seat belt pillows.

SUMMARY OF THE INVENTION

The preferred embodiment of "7"-shaped pillow of the present invention solves the aforementioned problems in a straight forward and simple manner.

Broadly, what is provided is a "7"-shaped seat belt pillow for use in a vehicle having a shoulder restraint strap comprising: a neck-supporting pillow member having a substantially elongated contour; and, a shoulder restraint pillow member angularly affixed to one end of the neck-supporting pillow member. The shoulder restraint pillow member is arranged and constructed with respect to the one end of the neck-supporting pillow member to form substantially a "7"-shaped profile and to approximate an angle of the shoulder restraint strap when buckled. Preferably, the neck-supporting pillow member has a first substantially uniform cross-sectional configuration in a non-compressed state. Additionally, the shoulder restraint pillow member has a second substantially uniform cross-sectional configuration in the non-compressed state wherein the first uniform cross-sectional configuration is larger than said second uniform cross-sectional configuration.

The method of using the pillow of the present invention comprises the steps of: positioning a neck support pillow member, dimensioned and contoured to traverse shoulders, behind the neck, the head or the portion of both the neck and the head of a user; draping a secondary body pillow member having a second longitudinal axis angled with respect to the first longitudinal axis and integrally formed with the neck support pillow member to curve around the neck and drape across a torso of the user; strapping the secondary body pillow member to a top side of a buckled shoulder restrain strap of the vehicle.

In view of the above an object of the present invention is to provide a "7"-shaped seat belt pillow which is comfortable, stable and provides a safe means of resting or sleeping in an automobile, bus or other vehicle or mode of transportation.

In view of the above objects, it is a feature of the present invention to provide a "7"-shaped seat belt pillow which is soft and plump and is contoured to resemble substantially the number "7".

Another feature of the present invention is to provide a "7"-shaped seat belt pillow which is relatively simple structurally and thus easy to manufacture.

A further feature of the present invention is to provide a "7"-shaped seat belt pillow which is easily attached and detached from the shoulder restraint strap of a vehicles seat belt assembly.

A further feature of the present invention is to provide a "7"-shaped seat belt pillow which is easy to use and which encourages proper seat belt usage.

A further feature of the present invention is to provide a 7"-shaped seat belt pillow which provides an inviting and comfortable means for hugging, cuddling or snuggling a torso-draped portion of the seat belt pillow.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 illustrates a front view of the "7"-shaped seat belt pillow of the present invention;

FIG. 2 illustrates a side view of the pillow of FIG. 1;

FIG. 3 illustrates the mode of attaching the pillow to the shoulder strap of a seat belt;

DESCRIPTION OF THE EXEMPLARY EMBODIMENT

Figure 4:
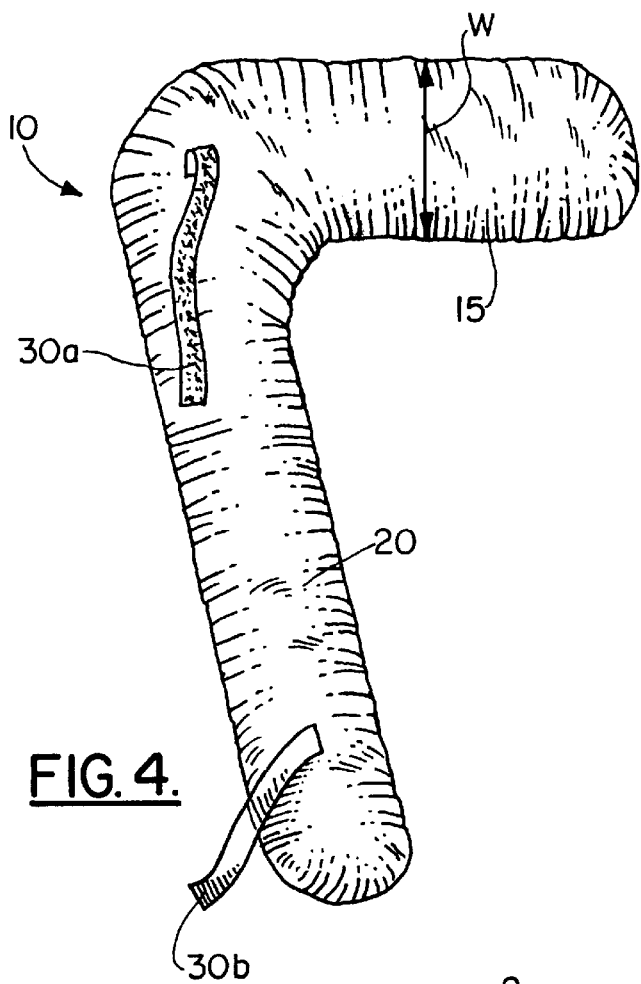
FIG. 4 illustrates a back view of the pillow of FIG. 1.

Referring now to the drawings, and in particular FIGS. 1–3, the "7"-shaped seat belt pillow of the present invention is designated generally by the numeral 10. The "7"-shaped seat belt pillow 10 includes a first pillow member 15 and a second pillow member 20 preferably integrally formed together in the shape of a "7."

In the exemplary embodiment, the first pillow member 15 or the neck-supporting pillow member is essentially rectangularly shaped and extends behind the head 2 and/or neck. Since the preferred embodiment of the "7"-shaped seat belt pillow 10 is to be used while sitting in an automobile seat 5, the width W of the rectangular shape or, in other words, the overall thickness T of the first pillow member 15 should provide neck support while the user sits in the seat 5 comfortably. Moreover, the thickness T should slightly prop-up the head.

The second pillow member 20 or shoulder restraint pillow member is angularly affixed to one end of the first or neck-supporting pillow member 15 wherein the second or shoulder restraint pillow member 20 is arranged and constructed with respect to the one end of the first or neck-supporting pillow member 15 to form substantially a "7"-shaped profile and to approximate an angle of the shoulder restraint strap 6 when buckled.

Figure 5:
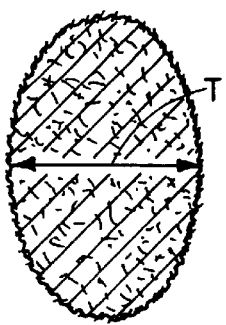
FIG. 5 illustrates a cross-sectional view of the upper portion of the pillow of FIG. 1.
Figure 6:
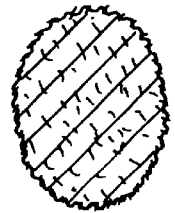
FIG. 6 illustrates a cross-sectional view of the lower portion of the pillow of FIG. 1.

Referring now to FIGS. 5–6, the first or neck-supporting pillow member 15 has a first substantially uniform cross-sectional configuration in a non-compressed state. The second or shoulder restraint pillow member 20 has a second substantially uniform cross-sectional configuration in the non-compressed state. The first uniform cross-sectional configuration is larger than said second uniform cross-sectional configuration. Preferably, the width of the second or shoulder restraint pillow member 20 is wider than the width of the shoulder restraint strap 6.

In the preferred embodiment, the lengths of the first pillow member 15 and the second pillow member arm 20 are approximately 11" and 14". Nevertheless, other sizes may be substituted such as for a child version or an adult version.

The "7"-shaped seat belt pillow 10 is generally constructed from a outer covering 12 having a resiliently deformable material 13 filled therein conventionally used for pillows. For example, the resiliently deformable material 13 may comprise a soft polyester fiber. The outer covering 12 may be comprised of cotton, polyester, or other fiber blends. Moreover, pillow members 15 and 20 are integral to form a unitary structure.

In the preferred embodiment, two straps 30a and 30b and two strap fasteners 31a and 31b are attached to opposite sides of the pillow 10. Strap 30a is positioned near the turning point of the "7" and the other strap 30b is positioned toward the lower part of the second pillow member 20. The straps 30a and 30b wrap around the shoulder restraining strap 6, as best seen in FIG. 3, and then attach back onto strap fasteners 31a and 31b, respectively, allowing an adult or child to sleep safely and comfortably while keeping their seat belt buckled.

In the preferred embodiment, the straps 30a and 30b and strap fasteners 31a and 31b employ hook-and-eyelet fasteners, such as manufactured by Velcro™. Any attaching means which provides quick and easy yet stable and secure attachment/detachment can also be used.

The "7"-shape is specifically contoured to closely approximate the angle of the shoulder restraining strap 6 giving support to the head 2 and neck while offering a body pillow for a soft and snuggly feel. The "7"-shape encourages the user to attach the pillow 10 to the shoulder restraining strap 6 at two separate locations, the neck and shoulder area as well as the abdomen area for a 1-2-3 buckle-up process.

The contouring of the "7"-shaped seat belt pillow 10 does not constrain both sides of the neck when in use. Instead, the first pillow member 15 extends behind the neck in a straight and supporting manner so that both the back and side of the neck can be supported as the user changes positions while sleeping or resting.

From the forgoing, the comfort obtained by the "7"-shaped seat belt pillow 10 serves to effectively discourage use of a seat belt in less than optimum operation (such as when a passenger fully reclines in the seat and, in such case, in order to seek a more comfortable positions, generally loosens the seat belt). The seat belt, through attachment to the invention, provides additional support and stability to the passenger's head without constraining.

As can be appreciated, the "7"-shaped seat belt pillow 10 is versatile in that pillow 10 can be used as a pillow while sleeping or resting on the floor, in a chair, such as, a recliner or in a bed. Thus, the operation of the "7"-shaped seat belt pillow 10 is not limited solely for use attached to the shoulder restraining strap 6.

Furthermore, as can be readily seen, "7"-shape is adapted to be used in the passengers side of the vehicle or on either side of the back seats. When the "7"-shaped seat belt pillow 10 is attached to the passenger's side shoulder restraint strap 6, the "7"-shaped seat belt pillow 10 should be positioned in the manner as shown in FIG. 4. Hence, by simply rotating the first pillow member 15 approximately 180°, the "7"-shaped seat belt pillow 10 becomes a backward "7"-shaped seat belt pillow 10.

Figure 7:
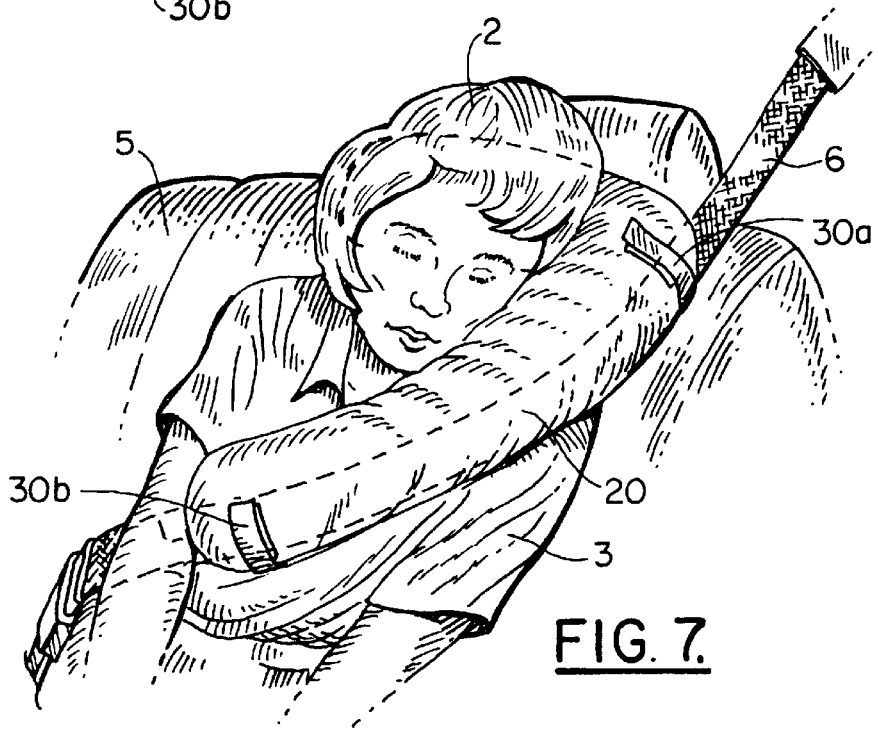
FIG. 7 illustrates a passenger's use of the pillow of the present invention in a vehicle.

Referring now to FIG. 7, the 1-2-3 buckle-up process includes (1) positioning the pillow 10 by placing the first pillow member 15 around the neck and draping the second pillow member 20 in front of the passenger 3; (2) buckling the seat belt in a conventional manner strapping the shoulder restraining strap 6 across the front of the passenger 3; and (3) wrapping the straps 30a and 30b around the shoulder restraining strap 6. The order of steps 1 and 2 is interchangeable.

The "7"-shaped seat belt pillow 10 of the present invention proves a comfortable, stable and safe means of resting/sleeping in an automobile, bus, airplane, helicopter, train, amusement park ride or other vehicle or mode of transportation. (The term "vehicle," as used anywhere in this specification, in addition to its ordinary meaning, includes each of the aforementioned means of transportation or movement.) The "7"-shaped seat belt pillow 10 is soft and plump and is contoured to resemble substantially the number "7".

As can be appreciated, the "7"-shaped seat belt pillow 10 is uniquely designed for comfort while resting or sleeping in a vehicle's seat. The comfort factor is accomplished by the unique arrangement between the first pillow member 15 and the second pillow member 20. The first pillow member 15 is a neck-supporting pillow member and the second pillow member 20 serves as a body pillow for snuggling and hugging if desired.

This design defines the first pillow member 15 as having a first longitudinal axis and a first substantially uniform cross-section configuration in a non-compressed state. The second pillow member 20 has a second longitudinal axis and a second substantially uniform cross-sectional configuration in the non-compressed state. The first longitudinal axis is adapted to substantially extend across the shoulders of passenger 3 while the second longitudinal axis is adapted to extend from the shoulder down across a torso of the passenger 3 at an angle. This unique "7"-shaped design is adapted to be strapped to a top side of the shoulder restraining strap 6, while the first pillow member 15 is positioned behind the head or neck.

This design provides for supporting a head, neck or a portion of both a head or neck while in a vehicle. The steps for using the pillow 10 includes positioning the first or neck-support pillow member 15, dimensioned and contoured to traverse shoulders, behind the neck, the head or the portion of both the neck and the head of the passenger 3. The next step includes draping the second or secondary body pillow member 20 having a second longitudinal axis angled with respect to the first longitudinal axis and integrally formed with the first or neck support pillow member 10 to curve around the neck and drape across a torso of the passenger 3. The final step includes strapping the second or secondary body pillow member 20 to a top side of a buckled shoulder restrain strap 6 of the vehicle.

It is noted that the embodiment of the "7"-shaped seat belt pillow described herein in detail, for exemplary purposes, is of course subject to many different variations in structure, design, application and methodology. Because many varying and different embodiments may be made within the scope of the inventive concept (s) herein taught, and because many modifications may be made in the embodiment herein detailed in accordance with the descriptive requirements of the law, it is to be understood that the details herein are to be interpreted as illustrative and not in a limiting sense.

What is claimed is:

1. A "7"-shaped seat belt pillow for use in a vehicle having a shoulder restraint strap comprising:

a neck-supporting pillow member having a substantially elongated contour; and, a shoulder restraint pillow member angularly affixed to one end of the neck-supporting pillow member wherein the shoulder restraint pillow member is arranged and constructed with respect to the one end of the neck-supporting pillow member to form substantially a "7"-shaped profile and to approximate an angle of the shoulder restraint strap when buckled, wherein:

the neck-supporting pillow member has a first substantially uniform cross-sectional configuration in a non-compressed state; and the shoulder restraint pillow member has a second substantially uniform cross-sectional configuration in the non-compressed state wherein the first uniform cross-sectional configuration is larger than said second uniform cross-sectional configuration.

2. The pillow of claim 1, wherein:

the neck-supporting pillow member has a first longitudinal axis; and, the shoulder restraint pillow member has a second longitudinal axis wherein the first longitudinal axis is shorter than the second longitudinal axis.

3. The pillow of claim 2, wherein:

the neck-supporting pillow member is approximately 11 inches; and the shoulder restraint pillow member is approximately 14 inches.

4. The pillow of claim 2, wherein the neck-supporting pillow member and the shoulder restraint pillow member are integral and form a unitary member having an outer covering having filled therein pillow stuffing material.

5. The pillow of claim 1, further comprising:

two spaced apart straps affixed to a back or front side of the shoulder restraint pillow member; and two spaced apart fasteners affixed to the other of the back or the front side of the shoulder restrain pillow member wherein the straps are arranged and constructed to affix the shoulder restraint pillow member on a top side of the shoulder restraint strap.

6. The pillow of claim 5, wherein fastening between the two spaced apart straps and the two spaced apart fasteners is effectuated by hook-and-eyelets fastening.

7. The pillow of claim 1, wherein said shoulder restraint pillow member is of a length sufficient to permit comfortable cuddling of said shoulder restraint pillow member.

8. The pillow of claim 1, wherein said shoulder restraint pillow member is of a length sufficient to permit an opposite arm of a user to comfortably rest on said shoulder restraint pillow member.

9. A "7"-shaped pillow comprising:

a first pillow member having a first longitudinal axis and a first substantially uniform cross-section configuration in a non-compressed state; and a second pillow member having a second longitudinal axis and a second substantially uniform cross-sectional configuration in the non-compressed state wherein the first uniform cross-sectional configuration is larger than said second uniform cross-sectional configuration; the first longitudinal axis is shorter than the second longitudinal axis; and the first longitudinal axis is adapted to substantially extend across shoulders of a user while the second longitudinal axis is adapted to extend from the shoulder down across a torso of the user at an angle.

10. The pillow of claim 9, wherein the first longitudinal axis is approximately 11 inches and the second longitudinal axis is approximately 14 inches.

11. The pillow of claim 9, further comprising:

at least one strap coupled to the second pillow member; and at least one fastener for fastening a free end of the strap to the fastener to effectuate securing of the second pillow member to a top side of a shoulder restraint strap of a seat belt assembly in a vehicle.

12. The pillow of claim 9, wherein the first pillow member and the second pillow member are integrally formed from an outer covering filled with a suitable pillow stuffing material.

13. A "7"-shaped pillow comprising:

a first pillow member having a first longitudinal axis and a first substantially uniform cross-section configuration in a non-compressed state; and a second pillow member having a second longitudinal axis and a second substantially uniform cross-sectional configuration in the non-compressed state wherein the first uniform cross-sectional configuration is larger than said second uniform cross-sectional configuration; the first longitudinal axis is shorter than the second longitudinal axis; and the first longitudinal axis is adapted to substantially extend across shoulders of a user in a vehicle while the second longitudinal axis is adapted to extend from the shoulder down across a torso of the user in a configuration which tracks a seat belt shoulder strap of said vehicle across said torso of said user.

* * * * *